United States Patent
Nguyen et al.

(10) Patent No.: US 12,170,692 B2
(45) Date of Patent: Dec. 17, 2024

(54) NETWORK SECURITY ORCHESTRATION AND MANAGEMENT ACROSS DIFFERENT CLOUDS

(71) Applicant: salesforce.com, inc., San Francisco, CA (US)

(72) Inventors: Toan Van Nguyen, Singapore (SG); Sriram Srinivasan, Milpitas, CA (US); Syed Abdullah Shah, Santa Clara, CA (US); Santhosh Ram Vetrinadar Manohar, San Jose, CA (US); Varun Kulkarni Somashekhar, Fremont, CA (US); Prabhat Singh, Sunnyvale, CA (US); Bogdan Florin Romanescu, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 424 days.

(21) Appl. No.: 16/948,399

(22) Filed: Sep. 16, 2020

(65) Prior Publication Data
US 2022/0086189 A1    Mar. 17, 2022

(51) Int. Cl.
H04L 9/40    (2022.01)
(52) U.S. Cl.
CPC .................................. H04L 63/20 (2013.01)
(58) Field of Classification Search
CPC ....................................................... H04L 63/20
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |

(Continued)

FOREIGN PATENT DOCUMENTS

| | | | | |
|---|---|---|---|---|
| CN | 104506487 B | * | 12/2017 | ......... H04L 63/0428 |
| EP | 3611619 A1 | | 2/2020 | |

(Continued)

OTHER PUBLICATIONS

"Rightscale 2019 State of the Cloud Report" *Flexera*, 2019.

(Continued)

*Primary Examiner* — Matthew Smithers
*Assistant Examiner* — Shu Chun Gao
(74) *Attorney, Agent, or Firm* — Weaver Austin Villeneuve & Sampson LLP

(57) ABSTRACT

Disclosed are examples of systems, apparatus, methods and computer program products providing network security orchestration and management across different clouds. In some implementations, network security information includes a set of security policies indicating permitted communications between or among computing resources. The network security information is converted to a cloud-independent representation. From the cloud-independent representation, policy sets can be generated, where each policy set is specific to a different cloud.

18 Claims, 13 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,082,102 B1 | 7/2006 | Wright |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,484,237 B2 | 1/2009 | Joly et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,404,757 B1 | 9/2019 | Horton |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |

(56) References Cited

U.S. PATENT DOCUMENTS

| | | |
|---|---|---|
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0188072 A1 | 8/2005 | Lee et al. |
| 2005/0198098 A1 | 9/2005 | Levin et al. |
| 2007/0156919 A1 | 7/2007 | Potti et al. |
| 2007/0282951 A1 | 12/2007 | Selimis et al. |
| 2008/0060051 A1 | 3/2008 | Lim |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0079266 A1 | 3/2012 | Ogata et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0019617 A1 | 1/2014 | Hadar |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2017/0251013 A1* | 8/2017 | Kirti .................. H04L 63/1441 |
| 2017/0339003 A1 | 11/2017 | Åström et al. |
| 2017/0339023 A1 | 11/2017 | Aström et al. |
| 2019/0007443 A1 | 1/2019 | Cook et al. |
| 2019/0068598 A1 | 2/2019 | Kang et al. |
| 2019/0098037 A1* | 3/2019 | Shenoy, Jr. ......... H04L 63/1441 |
| 2019/0158617 A1 | 5/2019 | Åström et al. |
| 2019/0312909 A1* | 10/2019 | Kulkarni ................ H04L 63/20 |
| 2020/0004742 A1 | 1/2020 | Nagarajan et al. |
| 2020/0059420 A1* | 2/2020 | Abraham ................ H04L 41/12 |
| 2020/0097481 A1 | 3/2020 | Cosentino et al. |
| 2020/0128047 A1* | 4/2020 | Biswas ............... H04L 63/1425 |
| 2020/0278813 A1 | 9/2020 | Nilsson |
| 2020/0382560 A1 | 12/2020 | Woolward et al. |
| 2021/0144550 A1* | 5/2021 | Ito ........................ H04W 12/06 |
| 2021/0314363 A1 | 10/2021 | Hensley et al. |
| 2021/0336929 A1 | 10/2021 | Moore et al. |
| 2022/0006842 A1 | 1/2022 | Wadhwa et al. |
| 2022/0086190 A1 | 3/2022 | Nguyen |
| 2022/0086193 A1 | 3/2022 | Nguyen et al. |

FOREIGN PATENT DOCUMENTS

| | | |
|---|---|---|
| JP | 5346010 B2 | 11/2013 |
| WO | WO-2017138944 A1 | 8/2017 |

OTHER PUBLICATIONS

"All Data Breaches in 2019 & 2020—An Alarming Timeline" *SelfKey Blog*, Jul. 5, 2020.

"Google Plus Users", Google+Ripples, Oct. 31, 2011 [retrieved on Feb. 21, 2012 from Internet at http://www.googleplusers.com/google-ripples.html], 3 pages.

International Search Report and Written Opinion dated Dec. 3, 2021, in Application No. PCT/US2021/049484, 13 pages.

Shahin, Mojtaba, Muhammad Ali Babar, and Liming Zhu. "Continuous integration, delivery and deployment: a systematic review on approaches, tools, challenges and practices." IEEE Access 5 (2017): 3909-3943.

Spinnaker: Cloud Native Continuous Delivery: Fast, safe, repeatable deployments for every Enterprise, Webpage, Accessed: Jan. 20, 2021.

International Preliminary Report on Patentability dated Mar. 30, 2023, in PCT Application No. PCT/US2021/049484.

U.S. Non-Final Office Action dated Jan. 23, 2024 in U.S. Appl. No. 17/248,529.

U.S. Non-Final Office Action dated Mar. 12, 2024 in U.S. Appl. No. 17/248,347.

U.S. Final Office Action dated Jul. 22, 2024 in U.S. Appl. No. 17/248,529.

\* cited by examiner

```
{
  {
    "datacenter": "datacenter1", ~304
    "functional_domains": {
      [
        {
          "name": "fd1",
          "sfdc_security_groups": [
            {
              "k8s_cluster_names": [
                "logging",
                "monitoring"
              ],
              "name": "Logging_Monitoring", ~308
              "policies": [                    ← 320
                {
                  "destination": {              ← 324
                    "services": ["proxy"]
                    "groups": ["Processing"]
                  },
                  "source": {                   ← 328
                    "services": ["all"]
                  }
                },
                {
                  "destination": {              ← 332
                    "services": ["service1", "service2", "service3"]
                  },
                  "source": {                   ← 336
                    "services": [
                      "service4",
                      "service5",
                      "service6",
                      "service7",
                      "service8"
                    ]
                  }
                }
              ],
              "public": false,                              ← 340
              "security_group_cidr": "10.0.0.0/12",         ← 342
              "security_group_functionality": "Logging_Monitoring",  ← 344
              "security_group_name": "DC.Test.Logging_Monitoring",
              "service_name": [                             ← 348
```

Figure 3A

```
                    "service4",
                    "service5",
                    "service6",
                    "service7",
                    "service8",
                    "service9",
                    "service10"
                ],
                "service_instances": [
                    {
       name: "service4",
       port:  8080,
                        protocol: "tcp"
                    },
                    ...
                ]
            },
            {
                "name": Processing,   ⟋312
                "security_group_cidr": "10.16.0.0/12",
                "security_group_functionality": "Processing",
                "security_group_name": "DC.Test.Processing",
                "service_name": [
                    "service1",
                    "service2",
                    "service3"
                ],
                "service_instances": [
                    {
                        "name": "service1",
                        "port": 443,
                        "protocol": "tcp"
                    },
                    {
                        "name": "service2",
                        "port": 587,
                        "protocol": "udp"
                    },
                    {
                        "name": "service3",
                        "port": 80,
                        "protocol": "tcp"
                    }
                ]
            },
            {
```

Figure 3A (Cont.)

```
"name": Gateway,              ~316
"service_name": [
   "proxy"
],
"service_instances": [
   {
      "name": "proxy",
      "port": 8443,
      "protocol": "tcp"
   }
]
         }
      ]
   },
   {
      "name": "fd2",
      ...
   }
 ]
 }
}
```

Figure 3A (Cont.)

```
                                                              ___ 300B
                                                          ↙
            security_group: DC.Test.Logging_Monitoring  ___ 350
                - subnet: 10.0.0.0/12  ___ 352
                - service_name: ___ 354
                    - "service4",
                    - "service5",
                    - "service6",
                    - "service7",
                    - "service8",
                    - "service9",
                    - "service10"
            public:false ___ 356
            policies:
            - description: Policy allowing DC.Test.Logging_Monitoring to
              DC.Test.Processing ___ 358
                communication
362 ___  source:
            securityGroup: DC.Test.Logging_Monitoring
364 ___  destination:
            securityGroup: DC.Test.Processing
366 ___  services:
            - description: tcp443/service1 ___ 368
              protocol: tcp ___ 372
370 ___       destPorts: '443'
            - description: service2
              protocol: udp
              destPorts: '587'
            - description: service3
              protocol: tcp
              destPorts: '80'

- description: Policy allowing DC.Test.Logging_Monitoring to
              DC.Test.Gateway ___ 360
                communication
              source:
                securityGroup: DC.Test.Logging_Monitoring
              destination:
                securityGroup: DC.Test.Gateway
              services:
              - description: proxy
                protocol: tcp
                destPorts: '8443'
```

Figure 3B

```
- root ─╱─ 424                                          ╱─ 400
   - DC Instance ─╱─ 420                           404
      - name: datacenter1                            ╱
         - Functional Domain (an independent chunk of network)
            - name: fd1
               - Security Group: Processing ─╱─ 412
                  - Subnet: 10.16.0.0/12
                  - Services ─╲─ 452
                     - service1
                     - service2
                     - service3
                  - Ingress rules ─╲─ 428
                     - tcp_443 (rule name) ─╲─ 436
                        - port: 443 ─╲─ 440
                        - protocol: tcp, udp ─╱─ 444
                        - source: [10.0.0.0/12, 10.32.0.0/12] ─╱─ 448
                     - udp_587
                        - port: 587
                        - protocol: udp
                        - source: [10.0.0.0/12]
                  - Egress rules ─╲─ 432
                     - allow_all ─╲─ 456
                        - port: 1-65355
                        - protocol: tcp, udp
                        - destination: [10.0.0.0/12, 8.8.8.8/32]

- Security Group: Logging_Monitoring ─╲─ 416
                  - Subnet: 10.0.0.0/12
                  - Services
                     - service4
                     - service5
                     ...
                  - Ingress rules
                  - Egress rules
               - Security Group: Gateway
                  - Subnet: 10.0.0.0/12
                  - Services
                     - proxy
                  - Ingress rules
                     - tcp_8443
                        - port: 8443
                        - protocol: tcp, udp
                        - source: [10.0.0.0/12]
                  - Egress rules
```

Figure 4

```
                                                  508                    ╱— 500A
                                                   │
504 ──resource "aws_security_group" "dc_test_processing_fd1" {
         count       = "${var.fd_name == "datacenter1_fd1" ? 1 : 0 }"
         description = "Security Group for Processing"
512 ── name        = "dc_test_processing_fd1"
         vpc_id      = "${var.vpc_id}"

516 ── tags = "${merge(var.platform_mandatory_tags,map(
             "Processing", "true",
           ))}"

lifecycle {
           ignore_changes = ["description"]
         }
      }

520 ──resource "aws_security_group_rule" "dc_test_processing_fd1_tcp_443"
      {
         count       = "${var.fd_name == "datacenter1_fd1" ? 1 : 0 }"
         description = "Policy from Logging_Monitoring to Processing on
      tcp_443"
         ⎡ type        = "ingress"
         ⎢ from_port   = 443
524 ──⎨ to_port     = 443
         ⎢ protocol    = "tcp"
         ⎣ cidr_blocks = ["10.0.0.0/12"]
528 ── security_group_id =
      "${aws_security_group.dc_test_processing_fd1.id}"
      } resource "aws_security_group_rule"
      "dc_test_processing_fd1_udp_587" {
         count       = "${var.fd_name == "datacenter1_fd1" ? 1 : 0 }"
         description = "Policy from Logging_Monitoring to Processing on
      udp_587"
         type        = "ingress"
         from_port   = 587
         to_port     = 587
         protocol    = "udp"
         cidr_blocks = ["10.0.0.0/12"]
         security_group_id =
      "${aws_security_group.dc_test_processing_fd1.id}"
      }
      ...
```

554 ─── resource "google_compute_firewall"
        "Policy_from_dc-test-logging_monitoring_to_dc-test-processing" {
             count    = "${var.fd == "dc_test_processing_fd1" ? 1 : 0 }"
558 ─── ── name     = "rule-1"
             network  = "${var.vpc}"
             project  = "${var.project}"
             priority = 10000
562 ─── ── direction = "INGRESS"

566 ─── ── allow {
             protocol = "tcp"
570 ─── ── ports    = ["80", "443",]
           }

574 ─── ── allow {
             protocol = "udp"
             ports    = ["587"]
           }

578 ─── ── deny {
             protocol = "udp"
             ports    = ["53", "161"]
           } target_tags   = ["dc-test-processing"]
           source_tags   = ["dc-test-logging-monitoring"]
           source_ranges = ["10.0.0.0/12"]
        } vpc {
        name: processing
        tag:    dc-test-processing
        subnet:       10.16.0.0/12
        }
```

Figure 5B

ABSTRACT# NETWORK SECURITY ORCHESTRATION AND MANAGEMENT ACROSS DIFFERENT CLOUDS

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to network security. More specifically, this patent document discloses techniques for network security orchestration and management across different clouds.

BACKGROUND

Enterprises are moving their infrastructures to public clouds for reasons including: fast bootstrapping processes, reliability, geographical availability, scalability and cost factor. Some estimate that over 90% of enterprises use clouds, and over 80% of enterprises have a multi-cloud strategy, in which an enterprise builds infrastructures on multiple cloud platforms. Reasons for a multi-cloud strategy include mitigating single cloud provider locking risks, privacy and governance compliance in different regions (e.g., an enterprise having to use a Chinese cloud provider if it wants to operate in China). Additional benefits of a multi-cloud strategy include greater agility and flexibility, and fulfillment of customer requests (e.g., customers might not want to host their data on a competitor's platform).

In the past number of years, we have witnessed many severe data breaches related to public cloud infrastructures. This problem is compounded in a multi-cloud strategy because the attack surface is bigger, and the chance for misconfiguration errors in multiple clouds is greater.

BRIEF DESCRIPTION OF THE DRAWINGS

The included drawings are for illustrative purposes and serve only to provide examples of possible structures and operations for the disclosed systems, apparatus, methods and computer program products. These drawings in no way limit any changes in form and detail that may be made by one skilled in the art without departing from the spirit and scope of the disclosed implementations.

FIG. 3A shows an example of a policy input 300A in JSON format, in accordance with some implementations.

FIG. 3B shows an example of a policy input 300B in YAML format, in accordance with some implementations.

FIG. 5A shows an example of a cloud-specific policy set 500A for an AWS cloud, in accordance with some implementations.

FIG. 5B shows an example of a cloud-specific policy set 500B for a GCP cloud, in accordance with some implementations.

DETAILED DESCRIPTION

Figure 1:
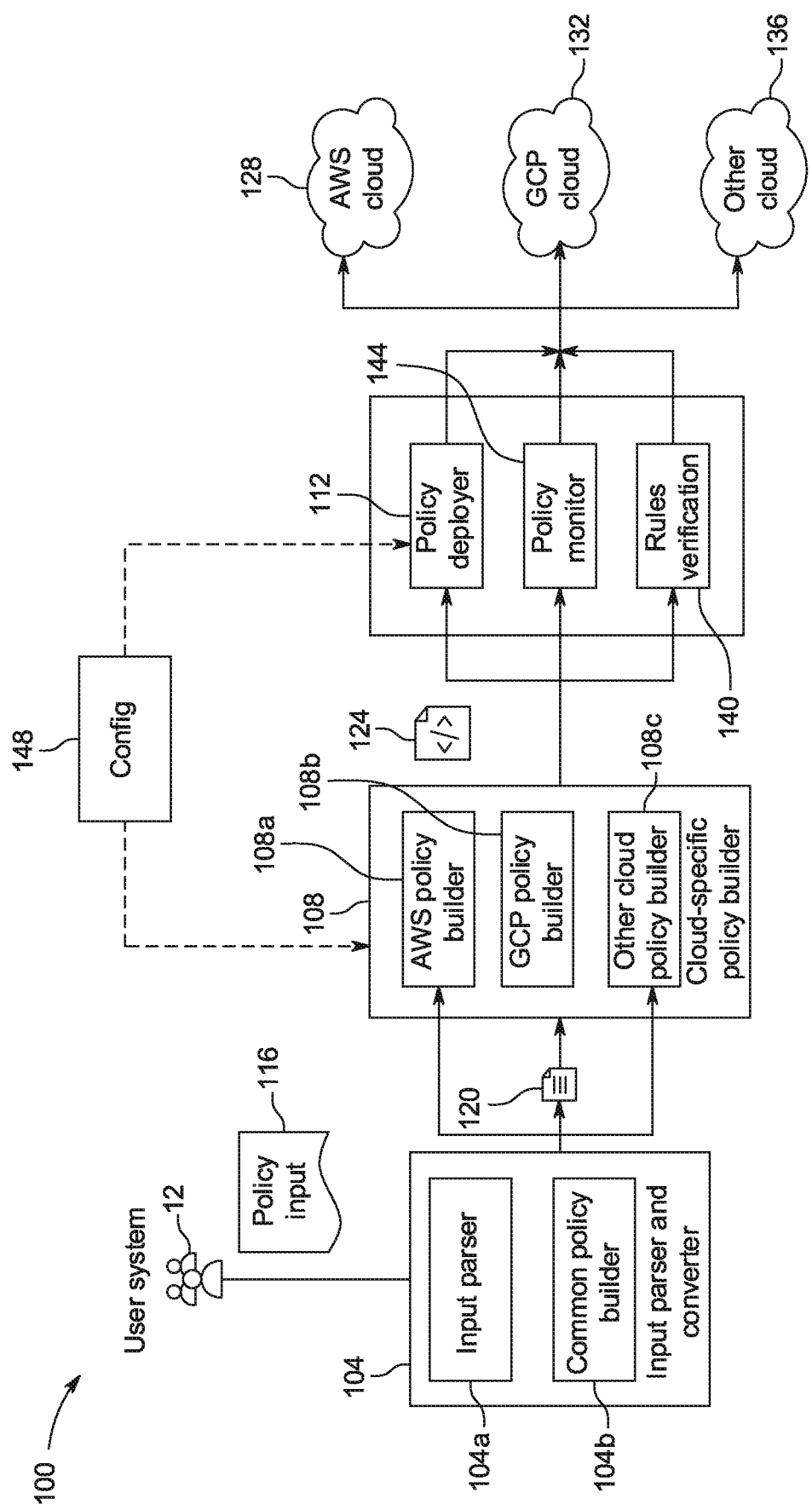
FIG. 1 shows a block diagram of an example of a network security system 100 providing a framework for network security orchestration and management, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used, and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer-readable media provide network security orchestration and management across different cloud providers to facilitate transitioning of enterprise infrastructure to public clouds. For instance, a multi-cloud infrastructure can be implemented on popular public cloud platforms including Amazon Web Services (AWS), Google Cloud Platform (GCP), Microsoft Azure and Alibaba Cloud. Customer data can be protected in the various public clouds of the multi-cloud infrastructure. Some implementations of disclosed network security techniques and frameworks provide fundamental security measures to protect customer data from unauthorized access. For instance, some security measures require that only entities (internal or external with respect to a network) with proper permissions and authorizations can access certain resources in the network.

In some implementations, a network security solution is provided in a multi-cloud infrastructure, even though each cloud provider provides different types of security primitives and protections. Some of the disclosed examples of network security solutions are cloud-independent; that is, the same version of a network security solution can be deployed on multiple clouds multiple times, even though the particular deployed solution on a given cloud uses that cloud's particular tools and supports. So, the same security posture is realized across the various clouds using cloud-specific security controls tailored to each cloud. Networks, infrastructures and data centers can be quickly scaled and expanded while maintaining the same security posture.

Some implementations of the disclosed network security solutions are transparent to users including application developers, service developers and engineers who write and deploy applications and services on a network. Such users do not need to know cloud-specific security controls to implement network security for their services. Some implementations of the disclosed frameworks and techniques offer a general, cloud-independent tool to users for that purpose.

Some implementations provide centralized orchestration, management, security policy versioning and security monitoring. For instance, a network security overview of data centers of interest can be generated even when those data centers are deployed on different clouds and regions. Using the disclosed techniques, network security policies can be added, removed and modified. These policies can be deployed to all or selective instances of data centers.

Once implemented, some of the disclosed network security frameworks and techniques can improve engineering productivity and reduce time delay when an enterprise is expanding to a new data center or region or adding a new cloud platform to a multi-cloud infrastructure. Engineers may not need to worry about learning a new cloud's security controls or have to deal with security orchestration for their services. Hence, engineers can focus on improving their services or building new products to boost productivity. Also, the time to bootstrap and deploy a new data center can be shorter than with conventional data center builds (e.g., a matter of days versus years).

Some of the disclosed network security frameworks and techniques can be implemented to realize a number of use cases including: bootstrapping a new data center on a cloud; adding, deleting, and modifying existing data center information such as a network layout or a policy; adding, deleting, and modifying a security group in a functional domain; adding, deleting, and modifying a service in a security group in a functional domain; and adding, deleting, and modifying a policy in a security group in a functional domain.

FIG. 1 shows a block diagram of an example of a network security system 100 providing a framework for network security orchestration and management, in accordance with some implementations. In the example of FIG. 1, system 100 has components including an input parser and converter 104, a cloud-specific policy builder 108 and a policy deployer 112. Input parser and converter 104 is configured to obtain a policy input 116. In this example, a user system 12 sends policy input 116 to input parser and converter 104. Policy input 116 can also or alternatively be retrieved by input parser and converter 104 from other computing resources such as servers, computing devices, memory devices, databases, other data repositories, etc.

In FIG. 1, policy input 116 is network security information including any number of security policies, which can form a set indicating permitted communications between or among computing resources. Policy input 116 can be in the form of a network design or layout and can be in various formats such as JSON or YAML, which can be used to declare network design attributes as further described and illustrated herein. Policy input 116 can include one or more of: subnet data, Internet Protocol (IP) address allocation data, service data, workload data, security group data, security zone data or access policy data, by way of example. For instance, policy input 116 can include data of a network design such as how many subnets, how many services, how many security groups, how many security zones, a characterization of the access policy within a zone and between/among services, etc.

In some implementations, the terms "security group" and "security zone" as used herein are interchangeable, for instance, when a security group refers to a zone where multiple online services or other computing resources like a server can be grouped together, and the grouped resources have the same security exposure to the outside, i.e., external to the zone. As further explained herein, for instance, it can be specified that a security group has specific ports which are open, like a listening port, and other ports which are blocked.

In FIG. 1, a policy set defined by policy input 116 can dictate allowed communications within a network or within a security zone and between or among computing resources within the network/security zone and outside entities. Outside entities refers to entities external to the network/security zone such as computing devices or systems of Internet users, customers of an enterprise, entities of a data center at a particular location, etc.

In some implementations, as shown in FIG. 1, input parser and converter 104 can be configured to include two sub-components: input parser 104a and common policy builder 104b. In this example, input parser 104a receives and reads policy input 116 in any of a number of available formats. After reading policy input 116, input parser 104a passes policy input 116 to common policy builder 104b, which is configured to convert policy input 116 to an internal representation 120 of policy input 116. In this example, internal representation 120 is a cloud-independent representation of policy input 116, that is, independent of any of the various available public cloud platforms such as AWS, GCP, Microsoft Azure, and Alibaba Cloud. Internal representation 120 is how a policy input is represented in system 100. Common policy builder 104b generates internal representation 120 as an output for further processing. As further explained herein, examples of internal representation 120 can specify one or more functional domains for an instance of a data center. Each functional domain can include one or more of: security groups of computing services, one or more subnets, one or more ingress rules, one or more egress rules, etc.

In FIG. 1, cloud-specific policy builder 108 is in communication with common policy builder 104b and takes internal representation 120. Policy builder 108 generates cloud-specific policy sets 124 from internal representation 120, and each cloud-specific policy set can be applied to a specific cloud platform such as AWS, GCP or Microsoft Azure. In this example, policy builder 108 includes sub-components in the form of AWS policy builder 108a, GCP policy builder 108b, and other cloud policy builder 108c. Each policy builder 108a, 108b or 108c uses cloud-specific tools, techniques, and native controls to convert internal representation 120 to a cloud-specific policy set as an output. For example, AWS policy builder 108a is configured to use security groups and security group rules to restrict access to computing resources. But GCP policy builder 108b is configured to use a firewall to restrict access to computing resources. The way each cloud provider (AWS, GCP, etc.) enforces policies is different from cloud-to-cloud. As further explained herein, a cloud-specific policy set can specify one or more of: an instance of a data center, computing resources, security groups of computing services, one or more subnets, one or more ingress rules, or one or more egress rules.

In FIG. 1, policy deployer 112 is in communication with policy builder 108 to receive cloud-specific policy sets. Policy deployer 112 is responsible for sending a cloud-specific policy set to the relevant cloud, such as deployment of an AWS-specific policy set to AWS cloud 128, a GCP-specific policy set to GCP cloud 132, and other cloud-specific policy set to other cloud 136. Policy deployer 112 can be implemented to have a cloud-specific configuration tool and a deployment pipeline to each cloud 128, 132 or 136.

In some implementations, policy deployer 112 uses Terraform by HashiCorp to deploy a cloud-specific policy set in the Terraform format to the relevant cloud. Terraform is one of a number of available tools or services that could be used by policy deployer 112 to deploy cloud-specific policy sets in a public cloud such as cloud 128, 132 or 136, so it should be appreciated that in some other implementations a different tool for state management and/or policy deployment is used by policy deployer 112 as an alternative or in addition to Terraform. For instance, a cloud-specific policy set could indicate a desired network structure including how many computing resources and/or how many containers are desired to be opened. Terraform can use the appropriate cloud application programming interface (API), like the AWS API, to create resources, containers, etc. Policy deployer 112 can take a generated cloud-specific policy set, call Terraform to run on a specific cloud, and then get a result back from the cloud directly or via Terraform.

In some implementations, a configuration (config) file can be sent to or retrieved by one or more components of system 100 to configure system 100. In some other implementations, the config file is omitted. In the example of FIG. 1, a config file 148 can be read by policy builder 108 and policy deployer 112 at runtime for system 100. Config file 148 has configuration properties including identifications of the particular clouds (128, 132 and 136 in this example) as the clouds for which policies will be built and the clouds to which policies will be deployed. In some instances, config file 148 can specify details such as network addresses and credentials for communicating with a cloud 128, 132 or 136.

In some implementations, a rules verification component 140 in FIG. 1 is implemented as a tool to verify that deployed policies on a particular cloud 128, 132 or 136 match with policies of a cloud-specific policy set. For instance, rules verification component 140 can determine, directly or via Terraform, that policies ultimately deployed on AWS cloud 128 match the AWS-specific policy set.

In FIG. 1, another component in the form of a policy monitor 144 in communication with clouds 128, 132 and 136 is configured to monitor deployment of a cloud-specific policy set to the relevant cloud. For instance, monitoring can include one or more of: obtaining deployment status information including success or an error in the deployment, obtaining resource status information indicating status of one or more computing resources in a cloud, detecting any drift or other change between the cloud-specific policy set and the actual policy set deployed on a cloud, generating a notification message indicating the change, or sending to the cloud a request message that any change be reverted. For instance, policy monitor 144 can make sure that the policies of a cloud-specific policy set were deployed to the specific cloud. If deployment is in progress or has completed, policy monitor 144 can determine such status and verify that specified resources are created and are up and running By the same token, policy monitor 144 can determine if there was a failure in deployment and what went wrong. If some entity modified, added to, or deleted a deployed policy, policy monitor 144 can reverse or request reversal of such changes.

In some implementations, an account is registered with each cloud 128, 132 or 136, and particular cloud-specific APIs are used by policy monitor 144 to retrieve the desired information for monitoring. Policy monitor 144 can request status of every resource that was created for the account, and Terraform can be used to read the status information using the appropriate APIs registered for the account. Status of accounts on the different public clouds can be read by policy monitor 144, and any modifications can be detected by policy monitor 144.

Figure 2:
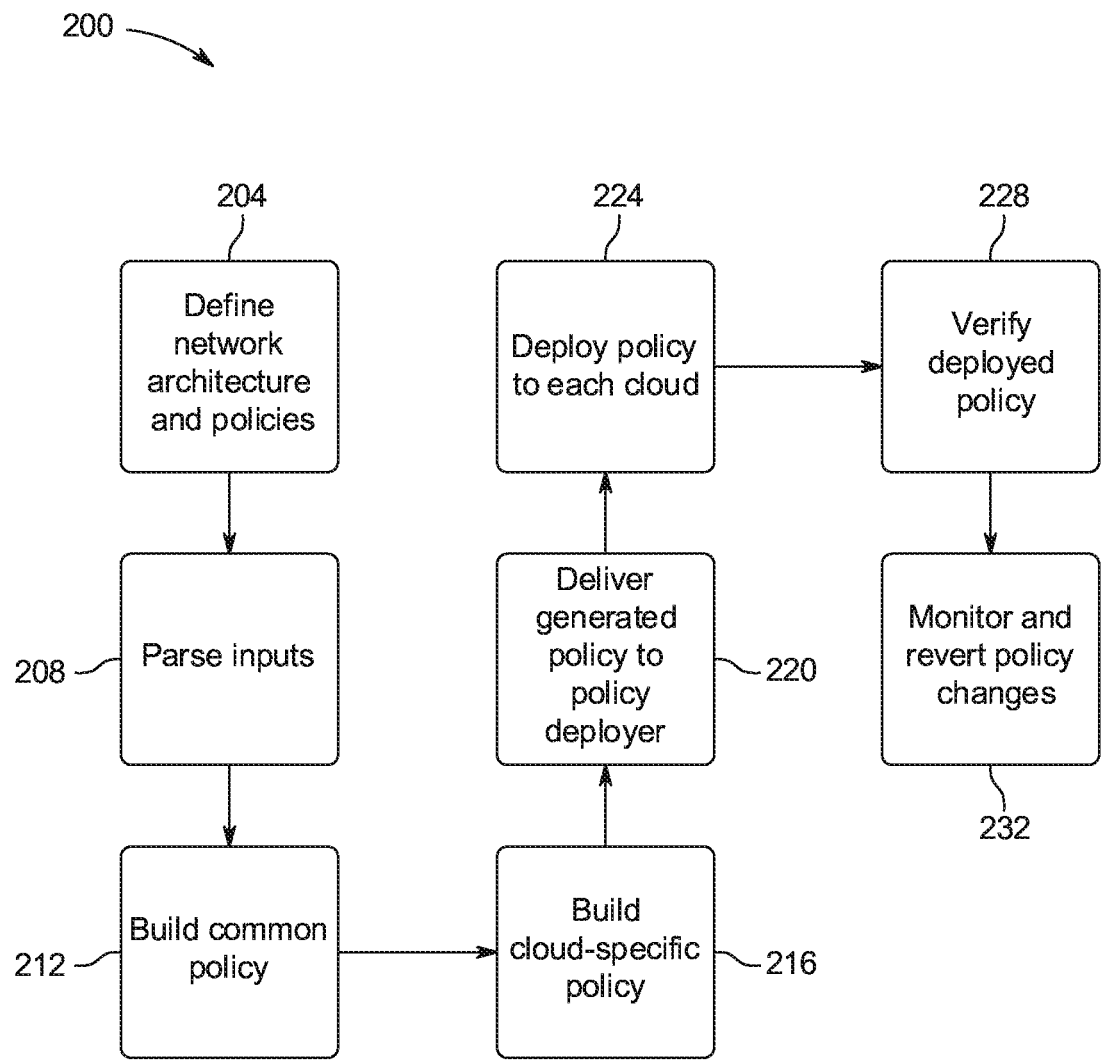
FIG. 2 shows a flowchart of an example of a method 200 for network security orchestration and management, in accordance with some implementations.

FIG. 2 shows a flowchart of an example of a method 200 for network security orchestration and management, in accordance with some implementations. At 204 of FIG. 2, a network architecture and associated security policies are defined. These policies can form a set indicating permitted communications between or among computing resources, as described herein. In some instances, the definition of policies at 204 can be initiated by a user system 12. For instance, user system 12 can be operated by a user, who is a service owner writing an online service for a data center. In another example, user system 12 can be a data center instance owner who desires to instantiate a new data center on a public cloud. Portions of the network architecture and security policies of 204 can also or alternatively be defined automatically by a server. In some implementations, the network architecture and policies of 204 are retrieved from a database or other memory device.

In FIG. 2, at 208, input parser 104a of FIG. 1 receives the information defined at 204 as a policy input 116 and parses policy input 116, as further explained herein. The parsed policy input 116 can then be relayed to common policy builder 104b, which is configured to build a common policy in the form of internal representation 120 at 212 of FIG. 2. At 216 of FIG. 2, cloud-specific policy builder 108 is configured to build cloud-specific policy sets 124 from internal representation 120 delivered by common policy builder 104b, as further explained herein. At 220, cloud-specific policy builder 108 delivers the generated cloud-specific policy sets 124 to policy deployer 112 of FIG. 1. Thus, at 224 of FIG. 2, policy deployer 112 can deploy each cloud-specific policy set to the applicable cloud, as further explained herein. At 228 of FIG. 2, rules verification component 140 of FIG. 1 can verify that the policies actually deployed on a particular cloud match the policies of the corresponding cloud-specific policy set delivered to policy deployer 112. At 232 of FIG. 2, policy monitor 144 communicates with clouds 128, 132 and 136 to monitor deployment of the cloud-specific policy sets.

FIG. 3A shows an example of a policy input 300A in JSON format, in accordance with some implementations, and FIG. 3B shows an example of a policy input 300B in YAML format, in accordance with some implementations. Policy inputs 300A and 300B provide two examples of many different policy inputs capable of being processed by input parser and converter 104 of FIG. 1. In the examples of FIGS. 3A and 3B, an infrastructure is declared for a particular instance of a data center. In FIG. 3A, at 304, security groups for the instance of the "datacenter1" data center are declared. In this example, security groups 304 include a first group 308 named "Logging_Monitoring," a second group 312 named "Processing," and a third group 316 named "Gateway." In other examples of policy inputs, additional security groups with other names can be included in the declared security groups.

At 320 of FIG. 3A, security policies are declared for the "Logging_Monitoring" group 308. There can be zero policies, one policy, or any number of policies declared for a particular security group. In the example of FIG. 3A, each policy has at least two fields: a destination, and a source. The destination as well as the source of a policy can specify services as well as security groups. Thus, specific services and/or security groups can be identified and user-customized There can be one or many services and/or groups set for the particular policy. In this example, a first policy is characterized by destination 324 and source 328. A second policy is characterized by destination 332 and source 336. A service and a group are named for destination 324, while "all" services are identified for source 328. Thus, in this example, there are no restrictions on which services can transmit data as a source for the first policy. In this example, a different set of services is specified for destination 332, as is the case with the services listed for source 336.

In the example of FIG. 3A, a "public" field 340 has a value of false, indicating that security group 308 is a private group as opposed to a public group. In other words, services in the security group are not exposed on the Internet or another data network. Thus, a port can be opened for services in this security group to accept incoming traffic from other internal services, that is, services within the instance of the data center in this example. At 342, an IP subnet range is defined for security group 308. This IP subnet range specifies that all services in the particular security group will get an IP address from the designated range of 10.0.0.0/12. At 344, a functionality of security group 308 is described, indicating in this example that the security group's function is logging and monitoring other services. A list of names of services in the security group is set forth at 348. Thus, when a policy is looked up during processing, the list of service names at 348 can be referenced. In this example, each service name in the list is unique, so a service can only belong to one security group.

In the example of FIG. 3B, a security group named "DC.Test.Logging_Monitoring" is identified at 350. Services in the group can draw an IP address from an IP subnet range identified at 352. For instance, when a service in security group 350 is deployed on a server, that server has to have an IP address in the designated subnet range at 352. A list of service names belonging to security group 350 is identified at 354, and a public or private designation as explained above is declared at 356.

In the example of FIG. 3B, at least two policies are declared for the security group: a first policy described at 358, and a second policy described at 360. Each policy has a source and a destination specified, as well as services specified. For instance, a source 362, a destination 364 and a list of services 366 are specified for the policy described at 358. In this example, a different security group, " "DC.Test.Logging_Monitoring," is named for source 362, and "DC.Test.Processing" is named for destination 364. A list of services is named at 366 for policy 358. Each service named in list 366 is able to listen at a specific port or range of ports and accepts a specified protocol. For instance, the service named tcp443/service1 368 listens at a port 443, indicated at 370, and accepts only TCP traffic, as indicated at 372. Thus, each service in list 366 is characterized in terms of open ports and open protocols. The policy declared at 360 follows a similar format as the policy declared at 358.

Figure 4:
FIG. 4 shows an example of an internal representation 400, in accordance with some implementations.

In the example of FIG. 4, input parser and converter 104 of FIG. 1 is configured to set up one or more functional domains of one or more data center instances: in this example, functional domain "fd1" at 404 of FIG. 4 and functional domain "fd2" at 408 of data center instance "datacenter1." In this example, a functional domain refers to a unique infrastructure of services and security groups that are categorized under an identifiable function. The function can be independent of other functions and related to any of a variety of enterprise purposes. For instance, a functional domain can be for the purpose of sales, marketing or human resources (HR). For each functional domain, a set of security groups is identified. In this example, the "Processing" security group 412 and the "Logging_Monitoring" security group 416 are identified in functional domain A. There may be one or many functional domains declared within a data center instance, referred to in this example as a DC Instance 420.

In FIG. 4, internal representation 400 is in a tree-based data structure. There is a root 424, and each data center instance (DC Instance) 420 is structured as a branch of root 424. Under each data center instance 420, each functional domain 404, 408, etc. is a branch of 420. Within each functional domain branch, there are sub-branches including: name, security group, subnet, services, ingress rules and egress rules. In the example of the "Processing" security group 412, ingress rules 428 and egress rules 432 have been built by input parser and converter 104 of FIG. 1. Ingress rules 428 are defined to filter the source of traffic, while egress rules 432 are configured to filter the destination of traffic. In this example, under the ingress rules 428 branch are sub-branches of rule names such as rule name 436 and leaves within the rule name of a port 440, protocol 444 and source 448. In this example, port 440 specifies that port 443 will be open to listen for incoming traffic, protocol 444 specifies that only TCP and UDP types of traffic will be accepted, while source 448 specifies that only traffic from the identified IP subnet ranges can talk to services identified at 452. The identified services 452 listen on the specified port 440. In this way, incoming traffic is filtered in this example.

In some implementations, egress rules 432 are generally configured in similar fashion as ingress rules 428. In this example, a special rule, "allow_all" 436 specifies that all services in security group 412 can talk with any entity outside or inside of a network on any port (1-65355) with the two protocols of TCP and UDP using the specified IP subnet address ranges for a destination, in this example, 10.0.0.0/12 and 8.8.8.8/32.

In FIG. 4, egress rules 432 provide for destinations associated with outgoing traffic rather than sources associated with incoming traffic. Thus, in this example, communication with security group "Logging_Monitoring" is permitted because that security group is in the subnet range of 10.0.0.0/12. In some other examples, particular IP addresses are specified in addition to or as an alternative to the ranges in FIG. 4.

FIG. 5A shows an example of a cloud-specific policy set 500A for an AWS cloud, in accordance with some implementations. In the example of FIG. 5A, policy set 500A provides one example of a policy output in Terraform format for an AWS cloud infrastructure. As further explained herein, Terraform is one tool providing a format for infrastructure programming of specific public clouds, as desired for some implementations. In policy set 500A, it is specified at 504 that a resource on AWS of the security group type is being created. At 508, the particular functional domain of a particular data center instance is identified. A name 512 matches the internal representation, in this example. At 516, tags are used to specify that any service belonging to the Processing security group will be attached. A first policy to be enforced is declared at 520. An ingress rule for the policy 520 is declared at 524. In this example, the ingress rule specifies that incoming traffic is allowed on port 443 if the protocol is TCP and traffic is from the IP subnet range 10.0.0.0/12. Rule names can be attached at 528, for instance, so Terraform will return a security group ID with the rule name when Terraform runs a program on the AWS cloud.

FIG. 5B shows an example of a cloud-specific policy set 500B for a GCP cloud, in Terraform format, in accordance with some implementations. In the example of FIG. 5B, a resource of the firewall type is declared at 554 using an appropriate GCP definition. The name of a policy to be enforced is identified at 558. In this example, ingress rules for the policy are declared at 562. In this example, a first ingress rule specifies that certain incoming communications are allowed at 566 when the communications satisfy the requirement of the TCP protocol as well as the requirement of coming in from designated ports and ranges at 570. Additional ingress rules 574 and 578 are declared with appropriate protocol and port requirements.

Figure 6A:
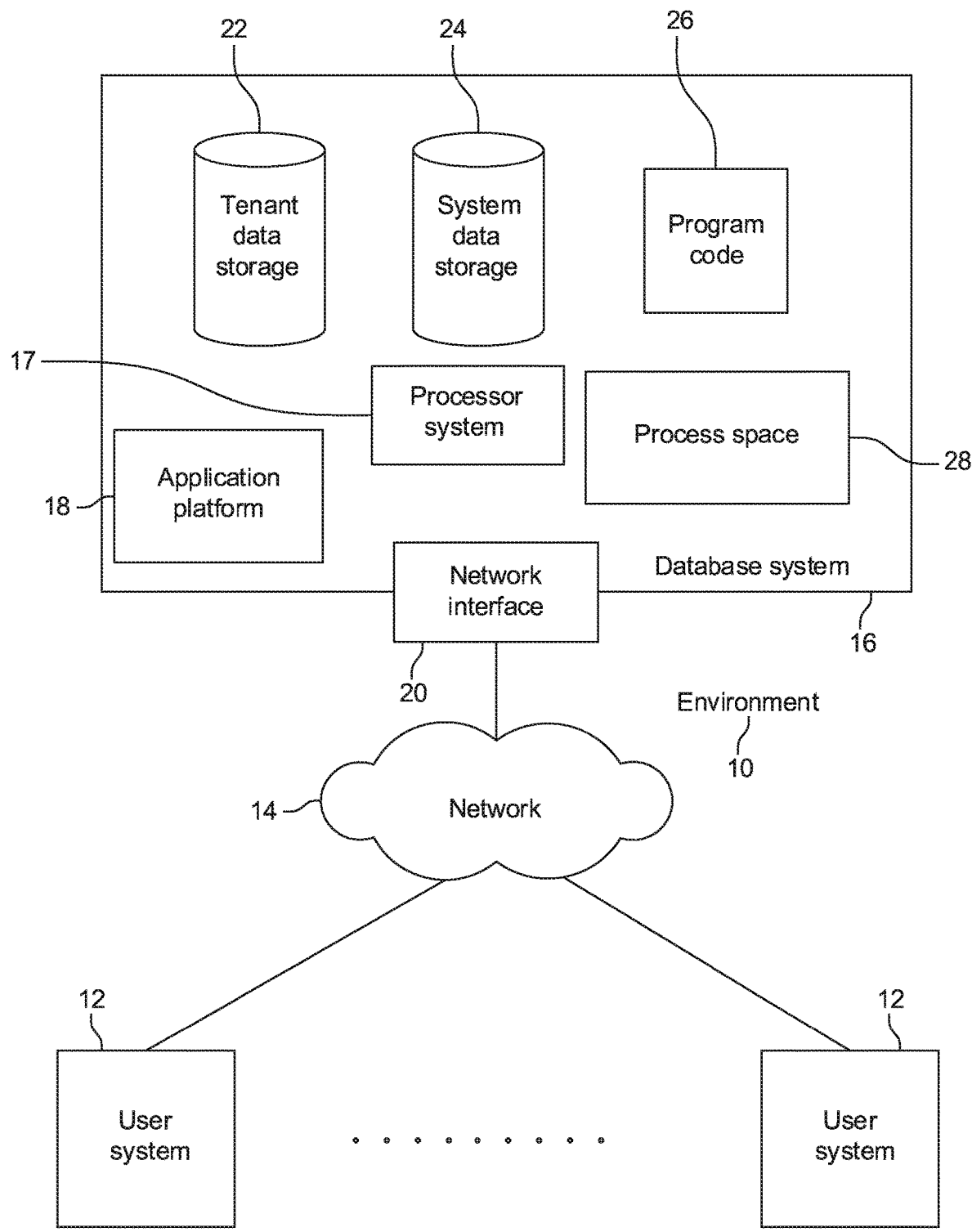
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a workstation and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 6B:
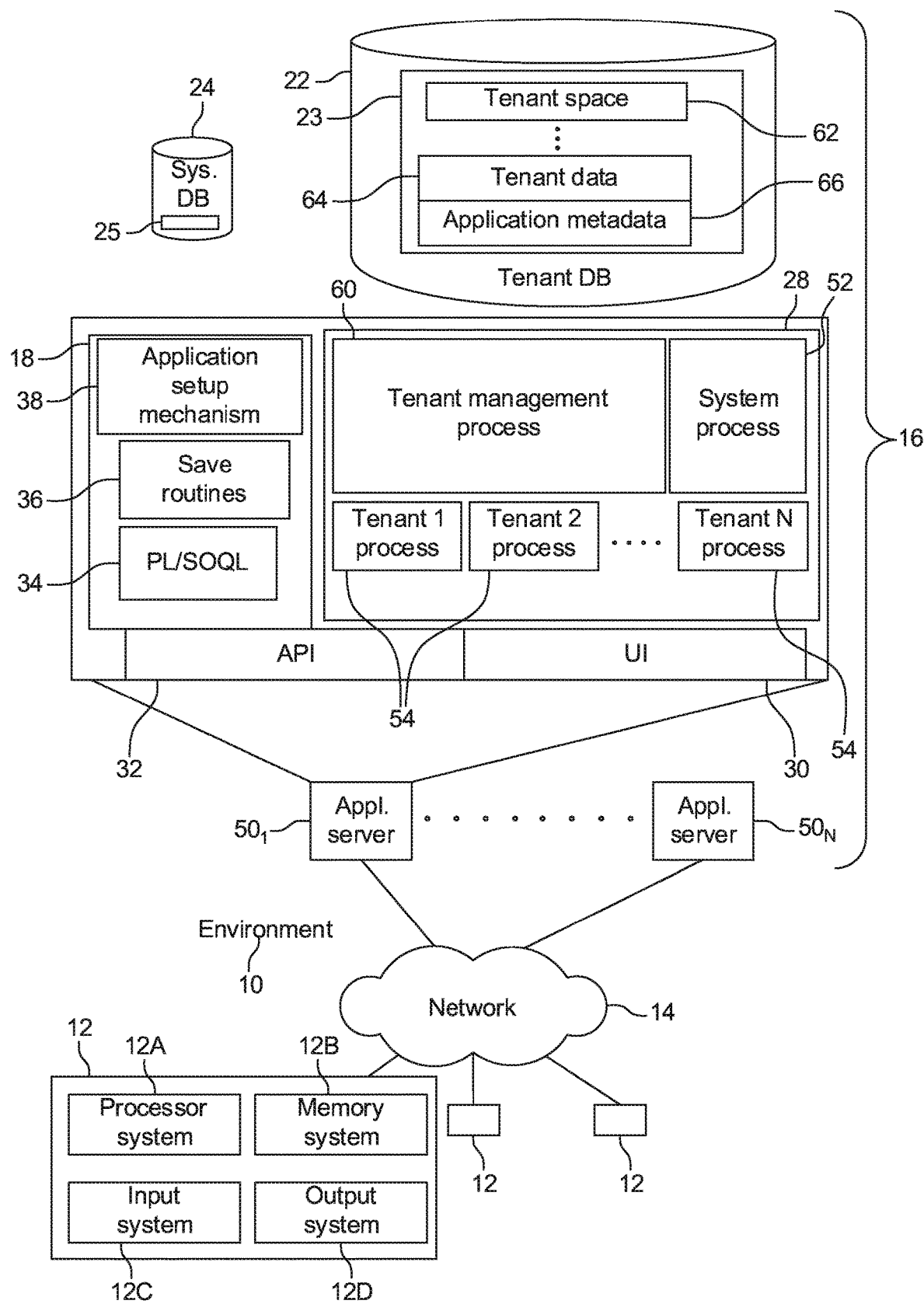
FIG. 6B shows a block diagram of an example of some implementations of elements of FIG. 6A and various possible interconnections between these elements.

One arrangement for elements of system 16 is shown in FIGS. 6A and 6B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
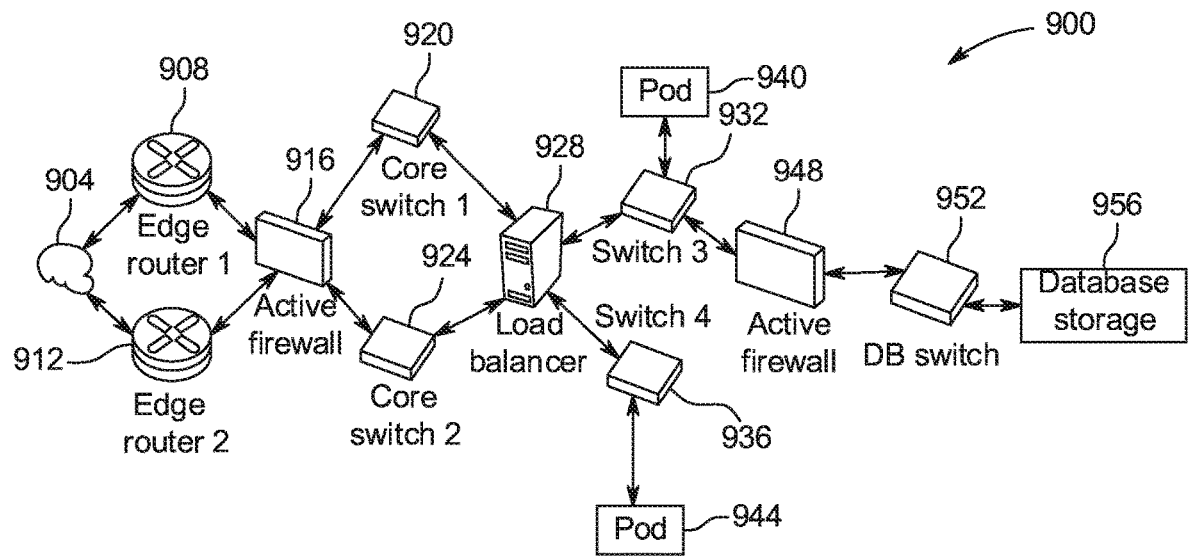
FIG. 7A shows a system diagram of an example of architectural components of an on-demand database service environment 900, in accordance with some implementations.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 7B:
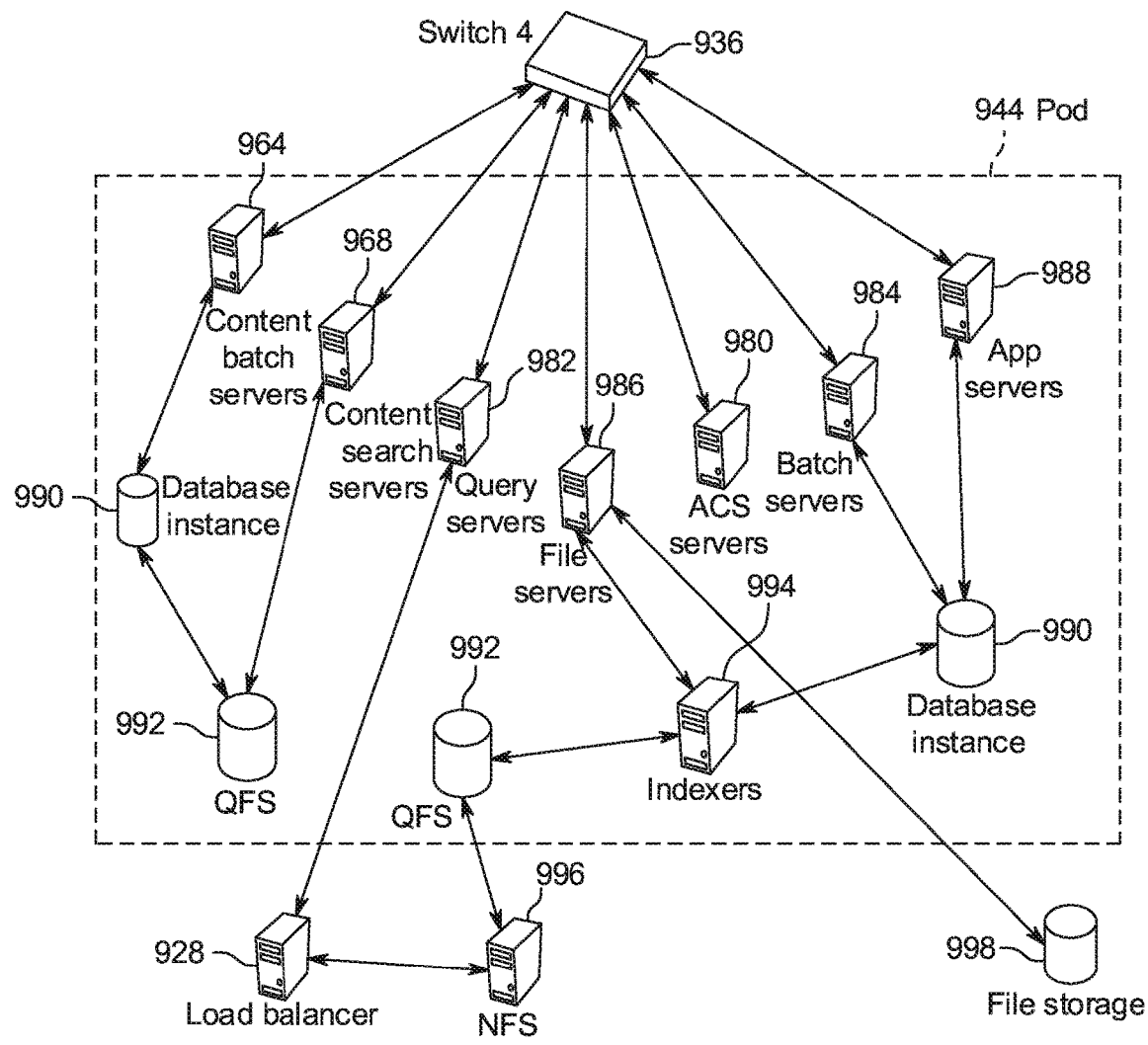
FIG. 7B shows a system diagram further illustrating an example of architectural components of an on-demand database service environment, in accordance with some implementations.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900.

In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 6A and 6B include a hardware and/or software framework configurable to execute procedures using programs, routines, scripts, etc. Thus, in some implementations, one or more of application servers $50_1$-$50_N$ of FIG. 6B can be configured to implement components and initiate performance of one or more of the operations described above with reference to FIGS. 1-5B by instructing another computing device to perform an operation. In some implementations, one or more application servers $50_1$-$50_N$ carry out, either partially or entirely, one or more of the disclosed operations described with reference to FIGS. 1-5B. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein, including operations described above with reference to FIGS. 1-5B. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above with reference to FIGS. 1-5B. For instance, lists of available communication channels associated with share actions for sharing a type of data item can be maintained in tenant data storage 22 and/or system data storage 24 of FIGS. 6A and 6B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a server system comprising one or more processors in communication with one or more memory devices, the server system configurable to cause:
obtaining network security information comprising a set of security policies indicating permitted communications between or among computing resources,
converting the network security information to a cloud-independent representation of the network security information,
generating, from the cloud-independent representation, a plurality of policy sets, each policy set being specific to a respective one of a plurality of clouds of different cloud providers,
sending, using a policy deployer having a cloud-specific configuration tool, each cloud-specific policy set to the respective cloud, wherein a cloud-specific policy set specifies one or more of: an instance of a data center, one or more computing resources, one or more security groups of computing services, one or more subnets, one or more ingress rules, or one or more egress rules, and monitoring deployment of a cloud-specific policy set to a respective cloud, the monitoring comprising detecting a change between the cloud-specific policy set and a different policy set deployed on the respective cloud.

2. The system of claim 1, wherein the monitoring further comprises one or more of: obtaining deployment status information indicating success or an error in the deployment, obtaining resource status information indicating status of one or more computing resources in the respective cloud, generating a notification message indicating the change, or sending to the respective cloud a request message that the change be reverted.

3. The system of claim 1, the server system further configurable to cause:

verifying deployment of a cloud-specific policy set to a respective cloud.

4. The system of claim 1, wherein the network security information comprises one or more of: subnet data, Internet Protocol (IP) address allocation data, service data, workload data, security group data, security zone data, or access policy data.

5. The system of claim 1, the policy deployer being associated with a deployment pipeline to a cloud, the policy deployer being configurable to process a cloud-specific policy set, the cloud-specific policy set comprising cloud-specific configuration data comprising one or more of: computing resource data or container data.

6. The system of claim 1, wherein the cloud-independent representation specifies one or more functional domains for an instance of a data center, each functional domain comprising one or more of: security groups of computing services, one or more subnets, one or more ingress rules, or one or more egress rules.

7. A computer program product comprising a non-transitory computer-readable medium storing computer-readable program code capable of being executed by one or more processors, the program code comprising instructions configurable to cause:

obtaining network security information comprising a set of security policies indicating permitted communications between or among computing resources;

converting the network security information to a cloud-independent representation of the network security information;

generating, from the cloud-independent representation, a plurality of policy sets, each policy set being specific to a respective one of a plurality of clouds of different cloud providers;

sending, using a policy deployer having a cloud-specific configuration tool, each cloud-specific policy set to the respective cloud, wherein a cloud-specific policy set specifies one or more of: an instance of a data center, one or more computing resources, one or more security groups of computing services, one or more subnets, one or more ingress rules, or one or more egress rules; and monitoring deployment of a cloud-specific policy set to a respective cloud, the monitoring comprising detecting a change between the cloud-specific policy set and a different policy set deployed on the respective cloud.

8. The computer program product of claim 7, wherein the monitoring further comprises one or more of: obtaining deployment status information indicating success or an error in the deployment, obtaining resource status information indicating status of one or more computing resources in the respective cloud, generating a notification message indicating the change, or sending to the respective cloud a request message that the change be reverted.

9. The computer program product of claim 7, the instructions further configurable to cause:

verifying deployment of a cloud-specific policy set to a respective cloud.

10. The computer program product of claim 7, wherein the network security information comprises one or more of: subnet data, IP address allocation data, service data, workload data, security group data, security zone data, or access policy data.

11. The computer program product of claim 7, the policy deployer being associated with a deployment pipeline to a cloud, the policy deployer being configurable to process the cloud-specific policy set, the cloud-specific policy set comprising cloud-specific configuration data comprising one or more of: computing resource data or container data.

12. The computer program product of claim 7, wherein the cloud-independent representation specifies one or more functional domains for an instance of a data center, each functional domain comprising one or more of: security groups of computing services, one or more subnets, one or more ingress rules, or one or more egress rules.

13. A method comprising:

obtaining network security information comprising a set of security policies indicating permitted communications between or among computing resources;

converting the network security information to a cloud-independent representation of the network security information;

generating, from the cloud-independent representation, a plurality of policy sets, each policy set being specific to a respective one of a plurality of clouds of different cloud providers;

sending, using a policy deployer having a cloud-specific configuration tool, each cloud-specific policy set to the respective cloud, wherein a cloud-specific policy set specifies one or more of: an instance of a data center, one or more computing resources, one or more security groups of computing services, one or more subnets, one or more ingress rules, or one or more egress rules; and monitoring deployment of a cloud-specific policy set to a respective cloud, the monitoring comprising detecting a change between the cloud-specific policy set and a different policy set deployed on the respective cloud.

14. The method of claim 13, wherein the monitoring further comprises one or more of: obtaining deployment status information indicating success or an error in the deployment, obtaining resource status information indicating status of one or more computing resources in the respective cloud, generating a notification message indicating the change, or sending to the respective cloud a request message that the change be reverted.

15. The method of claim 13, further comprising:

verifying deployment of a cloud-specific policy set to a respective cloud.

16. The method of claim 13, wherein the network security information comprises one or more of: subnet data, IP address allocation data, service data, workload data, security group data, security zone data, or access policy data.

17. The method of claim 13, the policy deployer being associated with a deployment pipeline to a cloud, the policy deployer being configurable to process the cloud-specific policy set, the cloud-specific policy set comprising cloud-specific configuration data comprising one or more of: computing resource data or container data.

18. The method of claim 13, wherein the cloud-independent representation specifies one or more functional domains for an instance of a data center, each functional domain comprising one or more of: security groups of computing services, one or more subnets, one or more ingress rules, or one or more egress rules.

\* \* \* \* \*